Patented June 5, 1923.

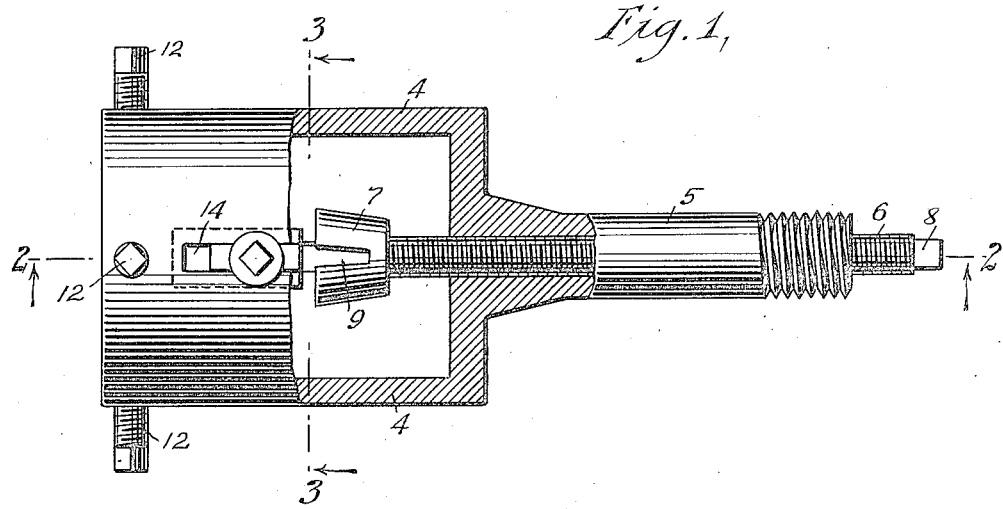
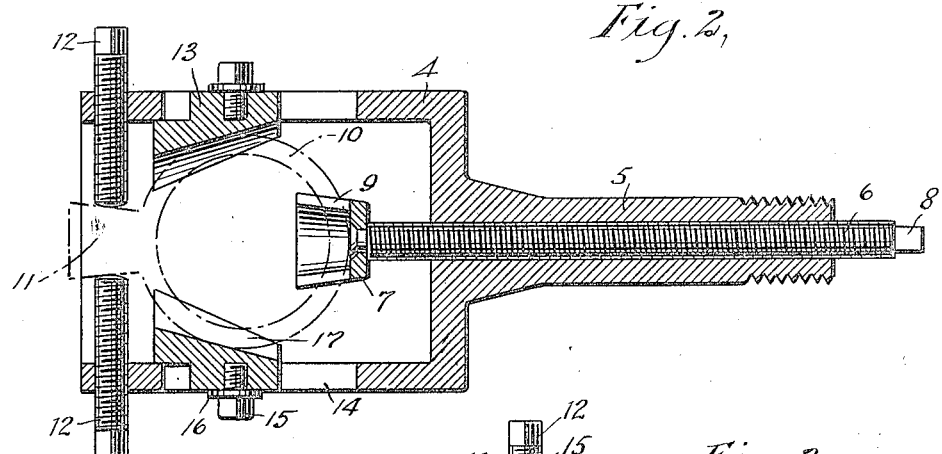
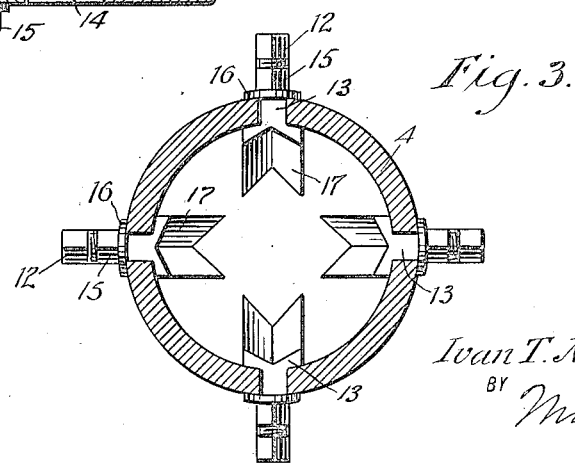

1,457,994

UNITED STATES PATENT OFFICE.

IVAN T. NEDLAND, OF HILLSBORO, NORTH DAKOTA.

CHUCK.

Application filed September 11, 1922. Serial No. 587,419.

*To all whom it may concern:*

Be it known that I, IVAN T. NEDLAND, a citizen of the United States, and a resident of Hillsboro, in the county of Traill and State of North Dakota, have invented a new and Improved Chuck, of which the following is a full, clear, and exact description.

This invention relates to lathe chucks, and more particularly aims to provide a novel combination of parts constituting a new type of chuck, preferably for a watchmaker's lathe, for securely and adjustably holding a finger ring with its circular band anchored within the chuck and behind an enlarged portion of the band to be machined by applying a suitable lathe tool to the enlarged portion to turn out a so-called flat-top basket stone-mounting.

Such basket mountings have recently come into great vogue, and heretofore attempts have been made to produce them only by hand, as with the use of a graver of the familiar kind, and then usually the mounting, instead of being a continuous bead, has comprised a cluster of separate leaves or prongs to enwrap the stone. Moreover, very few jewellers are able by hand to make a perfect basket-mounting of any kind.

By my novel chuck I have found that not only may the new basket mounting be made rapidly on a jeweler's lathe, but such mounting may be made very easily as to correct any predetermined location on the ring-band; and particularly, as will be obvious, such mounting may comprise a continuous bead, ultimately to permit the stone to be set in the ring with maximum aesthetic effect, and with greater security.

An important object of the invention is to provide a chuck having comparatively few adjustable parts and those of simple construction, and yet adapted to permit quick setting of the chuck to hold securely the ring's finger-band as well as the enlargement thereof or projection therefrom to be formed into the stone-mounting, and to function reliably in so holding rings of different finger-sizes and of various other dissimilar measurements.

With the foregoing and other objects in view, the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawing, in which Figure 1 is a side elevation of the new chuck, partially broken away and partially in section;

Figure 2 is an axial sectional view, taken on line 2—2 of Figure 1, and, further, showing a ring set in the chuck; and Figure 3 is a transverse section taken on line 3—3 of Figure 1.

Like reference characters refer to like parts throughout the several views.

The new chuck as shown in the drawing comprises merely the following parts:

A chuck shell 4 has an integral shank 5, the shank being centrally bored and threaded to receive an externally threaded rod 6 carrying inside the shell a holder or seat 7 for the band of the ring to be given the basket mounting by a turning operation. The opposite end of the rod, beyond the shank, is squared as at 8 to permit axial adjustment of the rod and adjustment of the seat 7 axially of the chuck shell.

Seat 7 may be fastened on rod 6, or may be rotatively mounted thereon, as is preferable.

Such seat or holder, it will be seen, is shaped like a cup, and is provided with a transverse cut or slot 9 to receive the band 10 of the finger ring at a point opposite the ring's projection, enlargement or boss 11 to be given the basket mounting. Such part 11 will be hereinafter referred to as the boss.

The slot 9 is preferably so shaped and positioned as to hold the band 10 of the ring within the shell and in a plane containing the axis of rotation of the chuck.

In order further to properly set the boss 11, so that its center of mass lies also in such axis, boss-engaging centering-means are provided; in the present instance including merely a plurality of radially arranged screws 12 individually adjustable in a well-known manner to center the boss as desired.

It will be noted that in the operation of mounting a ring in the new chuck the rod 6 as well as the screws 12 may be easily adjusted for mounting a ring of a different finger-size or different boss-conformation or both.

It has been found that a chuck constructed merely as so far described and with the slot 9 in seat or holder 7 of large enough width to take bands of various widths, functions adequately to hold a ring and its boss properly and securely in the chuck.

However, the chuck preferably includes the foregoing parts in combination with a plurality of adjustable dogs on opposite sides of the chuck and located between the boss-engaging screws 12 and the band-forking cup 7, for use where very precise work is to be done. In the drawing four of such dogs are shown, at 13; arranged as two spaced pairs each having the members of its pair spaced apart 180° around the chuck shell; either pair to be employed to take about opposite portions of the ring-band between the cup 7 and the screws 12.

The dogs 13, working inside the shell 4, are adjustable along the length of the shell, due to the provision of the slots 14, screws 15 and washers 16; each dog having an inclined groove 17 as shown in Figures 2 and 3 whereby a pair of dogs may be adjusted toward the shank 5 and secured on the shell 4 to clamp a band 10 tight within cup 7, and so leave screws 12 merely to act as a final nice adjusting means for boss 11.

While it will be seen that the construction above described is well adapted to attain the objects set forth; yet it should be understood that the details of construction described are merely parts of an illustrative embodiment of the invention, and may be departed from within the limits of the invention as defined by the appended claim.

I claim:

A chuck for holding a finger ring to present the mounting boss of the ring to a cutting tool including the combination of adjustable means for engaging and centering the boss, and means adjustable lengthwise of the chuck for engaging the ring proper, the means last-mentioned including a forked holder within the chuck for embracing the ring-proper, and also including a sliding dog on the chuck for engaging the ring proper intermediate the forked holder and the boss engaging means.

IVAN T. NEDLAND.